United States Patent Office 3,384,005
Patented May 21, 1968

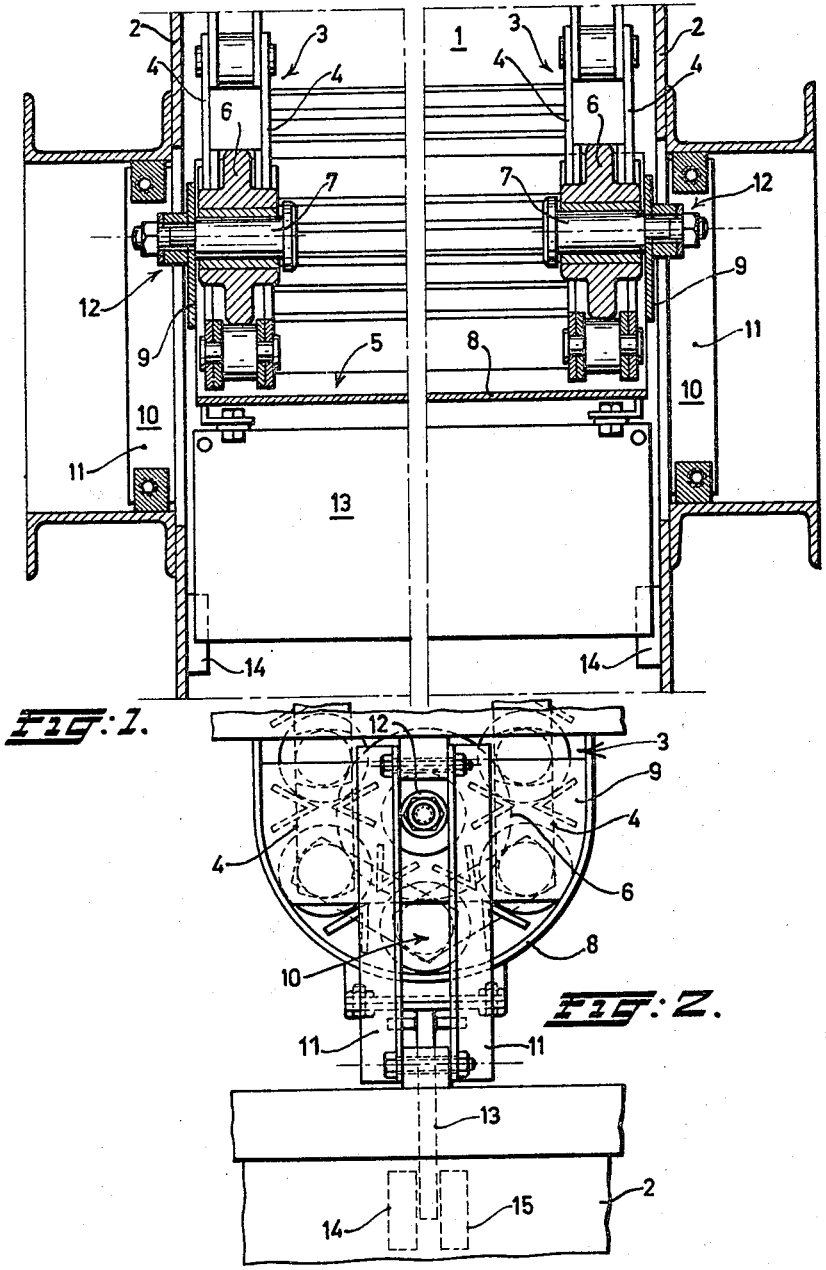

3,384,005
INSTALLATION FOR THERMAL TREATMENT OF COMMODITIES PACKED IN CONTAINERS
Johannes Bernardus van der Winden, Amstelveen, Netherlands, assignor to Gebr. Stork & Co's Apparatenfabriek N.V., Amsterdam, Netherlands
Filed June 23, 1966, Ser. No. 559,910
Claims priority, application Netherlands, July 9, 1965, 65—8,921
4 Claims. (Cl. 99—360)

ABSTRACT OF THE DISCLOSURE

Apparatus having a conveyor for the transport of carriers containing containers through a space in which the commodities in the containers undergo thermal treatment. The conveyor is composed of a conveyor element which transports the carriers along suspending loop paths, a guide member being provided at the bottom of each loop for guiding the conveyor element and the carriers while preventing emergence of the containers from the carriers. The guide member is mounted for vertical displacement in a fixed vertical slit while being prevented from undergoing tilting movement or swinging movement.

---

The invention relates to an installation for the thermal treatment of commodities packed in containers, such as the pasteurization or sterilization of food stuffs packed in tins or glass, the said device comprising a space where the containers receive treatment, through which space a conveyor advances in one or more suspending loops, the said conveyor consisting of one or more endless belts or chains, which are provided with carriers for the containers to be treated. Such an installation is known from the British patent specification No. 655,964 according to which means are provided for limiting the minimum radius of curvature of the lower end of each suspending loop. These means, consisting of specially formed sides of the carriers, serve to prevent the suspending loops of the conveyor from sagging into a V-shaped peak.

In this known installation there is still a problem at the point of guiding the carriers in the lower curves of the conveyor in order to prevent the containers from falling out of the carriers. Apart from the force of gravity the upward pressure of liquid also must be taken into consideration, since the lower curves of the conveyor are often suspended in the water. Attempts have been made to solve this problem by applying carriers which are shaped so that the risk mentioned hereinbefore of containers dropping out or floating away is avoided.

Stationary arranged guide members have also been applied in an attempt to avoid both V-shaped sagging of the conveyor and dropping out of the containers. In this case, however, it appeared to be impossible to absorb occurring fluctuations in length of the suspending loops. These fluctuations among other things result from continuously produced changes of the length of the suspending loops owing to the dimensions of the chain links moving along the guide rolls (the so called polygon phenomenon).

It is an object of the invention to provide an installation which can be conveniently applied with each arbitrary type of carrier, especially with carriers in which the containers are supplied and discharged from the long side, that is to say not from either end.

It is a further object to close the carriers temporarily by means of a guide member during the critical phase of tilting through 180°, so that no container can entirely or partially emerge from the carrier and thus no disturbance in operation can occur.

The invention also contemplates an automatic adaptation to each fluctuation in length of the conveyor, especially fluctuations owing to the polygon phenomenon.

The installation according to the invention will further be advantageous in that the guide member adapts itself to differences in load of the conveyor. These differences in load occur when at the loading station when a number of successive carriers are not filled or only partially filled with containers. The weight of the conveyor part will thus deviate from the normal weight of a filled conveyor. Due to these differences in weight the loops of the conveyor within the treatment space can sag more or less deeply. The guide member according to the invention adapts itself completely and automatically thereto.

The foregoing and other objects and advantages of he invention will appear in the description to follow. In the description, reference is made to the accompanying drawings, which form a part hereof, and in which there is shown by way of illustration and not of limitation a specific embodiment of the invention.

In the drawings:

FIGURE 1 is a vertical longitudinal section of a guide member with a part of the wall of the treatment space, the central part being left out.

FIGURE 2 is a side elevation of the guide member.

Figure 3:
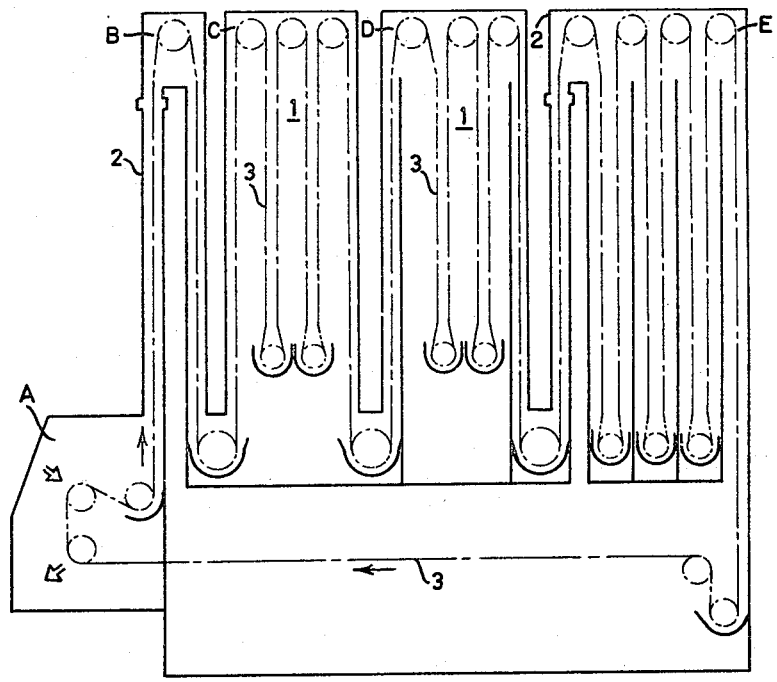
FIGURE 3 shows the installation in outline.

An embodiment of the installation according to the invention is shown in outline in FIGURE 3. The installation comprises five sections A–E. In section A the containers to be treated are charged at the upper side and are discharged at the lower side. In section B the containers are increased in temperature while passing through a liquid column. This column serves as a water lock and provides at the same time a counter pressure for the overpressure which is normally present within the installation. In the sections C and D the thermal treatment, properly speaking, takes place within the treatment space 1. This space is bounded by walls 2 while within this space a conveyor 3 is advancing, said conveyor passing also through the remaining sections A, B and E of the installation. In the section E, the containers are gradually cooled and the entry column of this section forms a liquid lock while simultaneously it provides the required counter pressure for the overpressure within the space 1.

FIGURE 1 shows a small part of the installation viz. the lower part of the treatment space 1 defined by walls 2 in which is disposed the conveyor 3 consisting of two endless chains 4. Between both chains 4 are a plurality of carriers (diagrammatically represented in FIGURE 2) of the type according to the U.S. Patent 3,211,275. The conveyor 3 is suspended in the treatment space 1 so as to form one or more loops and the lower end of such a loop is shown in the drawing.

Provided in this lower end is a guide member 5 comprising two chain wheels 6 cooperating with the chain 4. Each wheel 6 is mounted for rotation on an axle 7. The guide 5 is provided with a cylindrical plate 8, which is bent through an angle which at most is 180°, the said plate being situated under and concentric with the axles 7 of the guide wheels 6. The plate 8 is supported on the axles 7 by means of two strips 9.

In the walls 2 of the treatment space 1, are two vertical slits 10, which in this case are constituted by L shaped strips 11 secured at their lower and upper ends to the wall 2. A laterally elongated part 12 of each axle 7 is retained in a slit 10, so that the lower end of the suspending loop of the conveyor 3 is prevented from swinging. The rate of sag is taken up by the vertical height of each of the slits 10. These elements 11, 12 constitute a means for the limitation of the swinging movement of the guide member 5.

A flat vertically directed plate 13 is secured to the lower end of the plate 8, the edge of plate 13 being inserted with slight clearance between two abutment faces 14 and 15. The plate 13 forms an eccentric projection which due to its cooperation with one of the abutment faces 14 and 15 resists tilting of the guide member 5.

Figure 4:
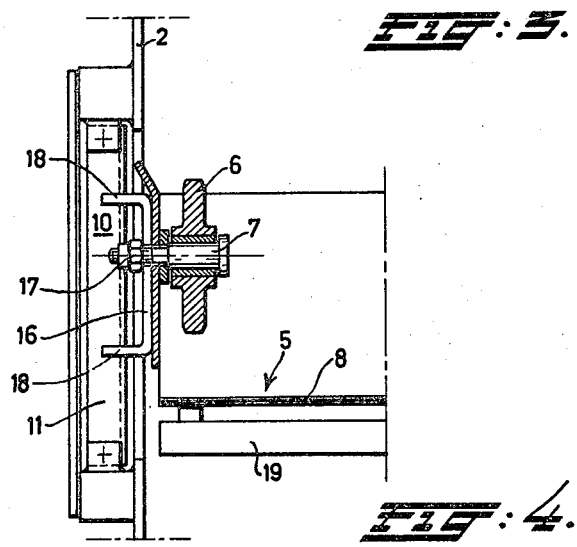
FIGURE 4 is a variant of the embodiment according to FIGURE 1.

In FIGURE 4 a variant is shown in which the means for limiting the swinging movement as well as the tilting movement are combined into one and the same element. On both shafts of the guide member 5 a U-shaped bow 16 is mounted and by means of a nut 17 secured to the guide member. The legs 18 of bow 16 fit in the vertical slits 10 between the strips 11. In view of the fact that both legs 18 are positioned outside the center line of the axis 7, the resistance to swinging and tilting is obtained. Below the guide member 5 a weight 19 is mounted.

The following advantages of the installation according to the invention and especially of the suspending curve guides can be summarized:

Due to the movement of the wheels 6 along with the movements of the lowermost curve, all kinds of carriers may be employed without the risk of the containers being pinched (owing to V-shaped sagging);

Due to the guide plate 8 it is possible to employ carriers which are distinguished by their very economical construction and furthermore allow for loading and discharging along the long side, without the risk of containers dropping out or floating away, when arriving at the lower curves;

Lengthwise fluctuations of the suspending loops of the conveyor are completely followed by the guide members.

While preferred embodiments of the invention have been shown and described, it is to be understood, that changes and variations may be made without departing from the spirit and scope of the invention as defined in the appended claims.

I claim:

1. Apparatus for the thermal treatment of commodities packed in containers, said apparatus comprising means defining a space in which the containers pass and the commodities undergo treatment, a conveyor for transporting the containers through said space in at least one suspending loop, said conveyor comprising at least one endless conveyor element adapted for supporting a carrier for the containers to be treated, a guide member for such carriers at the lower end of each loop, each guide member including a wheel around which the conveyor element passes, and a curved plate in which the carriers travel, said curved plate having an angular extent of at most 180°, said curved plate being situated below and concentric with the guide wheel, and means for limiting both swinging and tilting movement of the guide member.

2. Apparatus as claimed in claim 1, wherein the means for the limiting of the swinging and tilting movement comprises a laterally elongated axle on each said guide wheel, and means defining a stationary vertical slit in said treatment space for receiving a corresponding axle such that the axle is limited to vertical displacement in such slit and the guide member is thereby prevented from undergoing swinging movement.

3. Apparatus as claimed in claim 1, wherein the means for limiting the swinging and tilting movement comprises an eccentric projection on said guide member and vertical abutment means engaging said projection to prevent the projection, and thereby the guide member, from undergoing tilting movement.

4. Apparatus as claimed in claim 1, wherein said means for limiting swinging and tilting movement of the guide member comprises means on said guide member extending laterally thereof, and means defining a stationary vertical slit adjacent the guide member, said laterally extending means being engaged in said slit for being limited thereby as regards transverse movement of the guide member relative to the slit and angular movement of the guide member relative to the slit.

References Cited

UNITED STATES PATENTS 2,149,261  3/1939  Thompson.
3,211,275  10/1965  Van der Winden.

FOREIGN PATENTS 655,964  8/1951  Great Britain.

BILLY J. WILHITE, *Primary Examiner*.